United States Patent [19]
Yamada et al.

[11] Patent Number: 5,895,700
[45] Date of Patent: Apr. 20, 1999

[54] HONEYCOMB STRUCTURAL BODY

[75] Inventors: Toshio Yamada; Toshihiko Hijikata, both of Nagoya, Japan

[73] Assignee: NGK Insulators, Ltd., Japan

[21] Appl. No.: 08/857,284

[22] Filed: May 16, 1997

[30] Foreign Application Priority Data

May 17, 1996 [JP] Japan .................................. 8-123032

[51] Int. Cl.⁶ .................................................. B32B 3/12
[52] U.S. Cl. .................... 428/116; 428/118; 428/188
[58] Field of Search .................... 428/116, 117, 428/118, 188

[56] References Cited

U.S. PATENT DOCUMENTS

| | | | |
|---|---|---|---|
| 3,181,928 | 5/1965 | Frilette et al. | 423/212 |
| 3,562,178 | 2/1971 | Hughes et al. | 502/117 |
| 3,873,350 | 3/1975 | Dwyer et al. | 428/116 X |
| 3,885,977 | 5/1975 | Lachman et al. | 428/116 X |
| 3,925,535 | 12/1975 | Belliot et al. | 423/213.2 |
| 3,939,103 | 2/1976 | Belliot et al. | 502/174 |
| 3,985,683 | 10/1976 | Stenzel | 502/324 |
| 4,042,738 | 8/1977 | Gulati | 428/116 |
| 4,556,543 | 12/1985 | Mochida et al. | 428/116 X |
| 4,904,540 | 2/1990 | Ishii et al. | 428/116 X |
| 4,970,188 | 11/1990 | Steinbach et al. | 502/163 |
| 5,030,398 | 7/1991 | Hamanaka et al. | 264/631 |
| 5,063,029 | 11/1991 | Mizuno et al. | 428/116 X |
| 5,064,609 | 11/1991 | Harada et al. | 419/58 |
| 5,164,351 | 11/1992 | Steinbach et al. | 502/74 |
| 5,165,970 | 11/1992 | Schmidt et al. | 427/430.1 |
| 5,286,460 | 2/1994 | Abe et al. | 422/174 |
| 5,356,852 | 10/1994 | De Liso et al. | 428/116 X |

FOREIGN PATENT DOCUMENTS

| | | |
|---|---|---|
| 0 241 269 A2 | 10/1987 | European Pat. Off. . |
| 0 241 269 A3 | 10/1987 | European Pat. Off. . |
| 0 444 494 A1 | 9/1991 | European Pat. Off. . |
| 0 638 710 A2 | 2/1995 | European Pat. Off. . |
| 0 638 710 A3 | 2/1995 | European Pat. Off. . |
| 59-39346 | 3/1984 | Japan . |
| 62-49454 | 10/1987 | Japan . |
| 4-70053 | 11/1992 | Japan . |

OTHER PUBLICATIONS

P. 837 and the Title Page and the Verso of the Title page of Webster's Seventh New Collegiate Dictionary.

*Primary Examiner*—Henry F. Epstein
*Attorney, Agent, or Firm*—Parkhurst & Wendel, L.L.P.

[57] ABSTRACT

A honeycomb structural body with improved spalling strength includes a plurality of passages aligned in its axial direction which are defined by partition walls. In the honeycomb structural body, a ratio of L/d is in a range of 0.4–1.3, where d is a diameter of an inscribed circle of the periphery of the honeycomb structural body on a plane perpendicular to its axial direction, and L is a length along the axial direction of the honeycomb structural body.

7 Claims, 6 Drawing Sheets

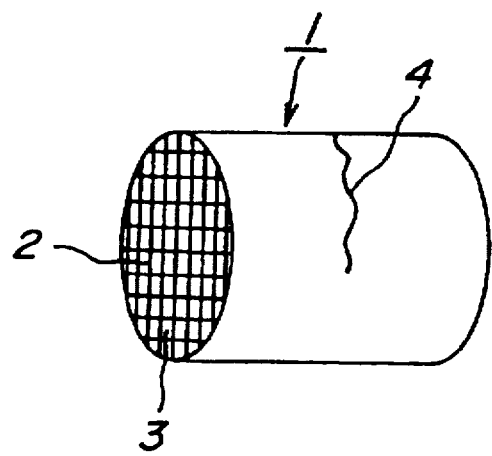
FIG_1a
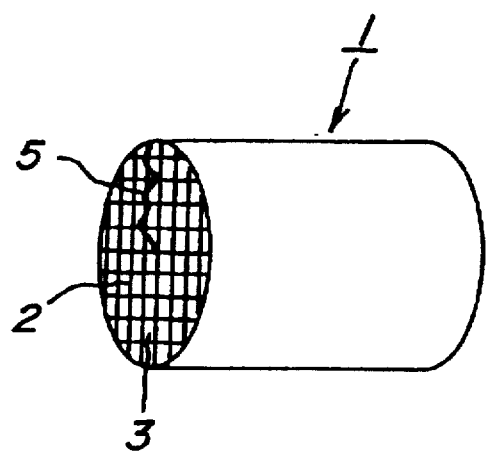
FIG_1b
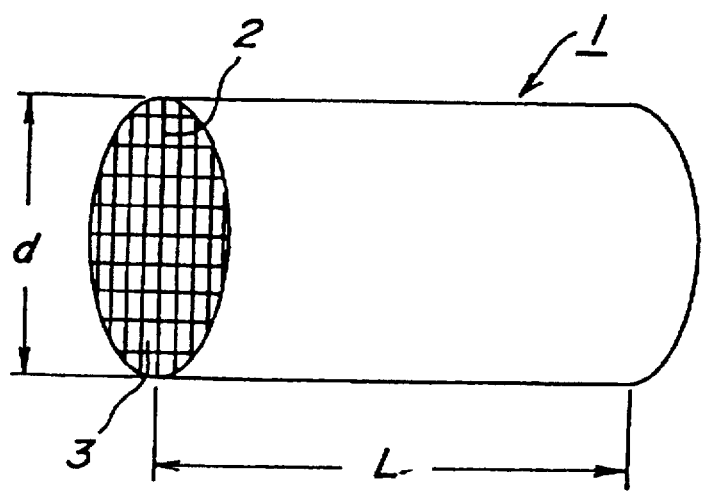
FIG_2

HONEYCOMB STRUCTURAL BODY

BACKGROUND OF THE INVENTION (1) Field of the Invention

The present invention relates to a honeycomb structural body especially used as a catalyst carrier in an exhaust gas purifying apparatus or a firing apparatus such as a boiler or a combustion apparatus such as an internal combustion engine.

(2) Related Art Statement

As the catalyst carrier of the exhaust gas purifying apparatus, the honeycomb structural body has been used. Generally, just after the automobile engine starts, i.e. in a so-called "cold start" state, in which a temperature of the exhaust gas from an exhaust gas generation source is low, it is necessary to increase a temperature ascending rate of the catalyst in the exhaust gas purifying apparatus to activate the exhaust gas purifying function as soon as possible. In order to achieve this requirement, a technique, whereby a thermal capacity of the catalyst is decreased (and thus a temperature ascending rate is made faster) by forming a partition wall of the honeycomb structural body thinner to an order of 0.15 mm or 0.1 mm, is disclosed in Japanese Patent Laid-Open Publication No. JP-A-7-39761.

Moreover, in order to further improve the exhaust gas purifying performance, a technique, whereby a geometric surface area of the honeycomb structural body is increased, i.e. the number of passages per unit area on a surface thereof perpendicular to a passage extending direction (hereinafter, sometimes called cell density) is increased, is disclosed in papers of No. 960560 and No. 960261 of SAE (Society of Automotive Engineers) in the United States.

With the above mentioned prior art, however, the following result is found. That is, in order to obtain an excellent exhaust gas purifying performance of the catalyst carrier including a ceramic honeycomb structural body, if the partition wall is formed extremely thin, i.e., to an order of smaller than 0.1 mm, and if the cell density is increased to an order of larger than 100 cells per cm$^2$, a spalling strength of the honeycomb structural body indicating a thermal shock resistivity is largely decreased only when a ratio of L/d, wherein d is a diameter of the honeycomb structural body and L is a length thereof, exists in a certain range.

The spalling strength mentioned above is estimated as follows. At first, the honeycomb structural body is heated by an electric furnace or a burner using combustion gas and then cooled. Then, whether or not a defect of the honeycomb structural body such as cracks is generated is observed. In this case, the spalling strength is estimated by a safety temperature obtained as the highest temperature at which the honeycomb structural body shows no defect. The spalling strength using the electric furnace is defined by automotive standard M505-87 issued by Society of Automative Engineers of Japan, Inc. Moreover, as a fracture type due to the crack generation mentioned above, it is found that there are two types. That is, as shown in FIG. 1a, one crack type is a ring crack 4 in which the honeycomb structural body 1 is broken in the directions at a plane substantially perpendicular to an axial direction of passages 3 defined by partition walls 2. Further, as shown in FIG. 1b, the other crack type is an end crack 5 in which a crack is generated at one end surface or both end surfaces of the honeycomb structural body 1.

When the catalyst carrier including the honeycomb structural body is used in an automobile, it is better that the honeycomb structural body has a higher spalling strength mentioned above. This is because the higher spalling strength is an extremely significant characteristic in the case that the honeycomb structural body is exposed to a high temperature exhaust gas as compared with the conventional one or in the case that a temperature of the exhaust gas during a high speed driving becomes higher so as to improve fuel consumption, since it is necessary to arrange the catalyst carrier in the vicinity of the engine according to the severe exhaust gas regulation. Then, if the cracks mentioned above are generated during an actual use due to the low spalling strength, a decrease of exhaust gas purifying performance, a decrease of engine power in accordance with pressure loss increase, and a generation of noise from the exhaust system occur. From the view points mentioned above, even in the honeycomb structural body having an improved exhaust gas purifying performance, it is desired to obtain a honeycomb structural body having higher spalling strength.

SUMMARY OF THE INVENTION

An object of the invention is to eliminate the drawbacks mentioned above and to provide a honeycomb structural body having a high spalling strength while maintaining a high exhaust gas purifying performance.

According to the invention, a honeycomb structural body comprises a plurality of passages aligned in its axial direction which are defined by partition walls, wherein a ratio of L/d is in a range of 0.4–1.3, where d is a diameter of an inscribed circle of the periphery of the honeycomb structural body on a plane perpendicular to its axial direction, and L is a length along the axial direction of the honeycomb structural body.

In the present invention, it is found that the honeycomb structural body having an excellent spalling characteristic can be obtained by setting a ratio of L/d in a range of 0.4–1.3, preferably 0.6–1.1, more preferably 0.7–1.0, most preferably 0.8–0.9, where d is a diameter of an inscribed circle of the honeycomb structural body and L is a length thereof. Moreover, it is found that this effect is particularly remarkable in the case that a thickness of the partition wall is smaller than 0.1 mm and the number of the passages is 100 cells per cm$^2$.

BRIEF DESCRIPTION OF THE DRAWINGS

FIGS. 1a and 1b are schematic views for explaining a fracture type of a honeycomb structural body under an estimation test of a spalling strength;

FIG. 2 is a schematic view showing a shape of the honeycomb structural body used in the embodiment according to the invention;

DESCRIPTION OF THE PREFERRED EMBODIMENTS

Figure 3:
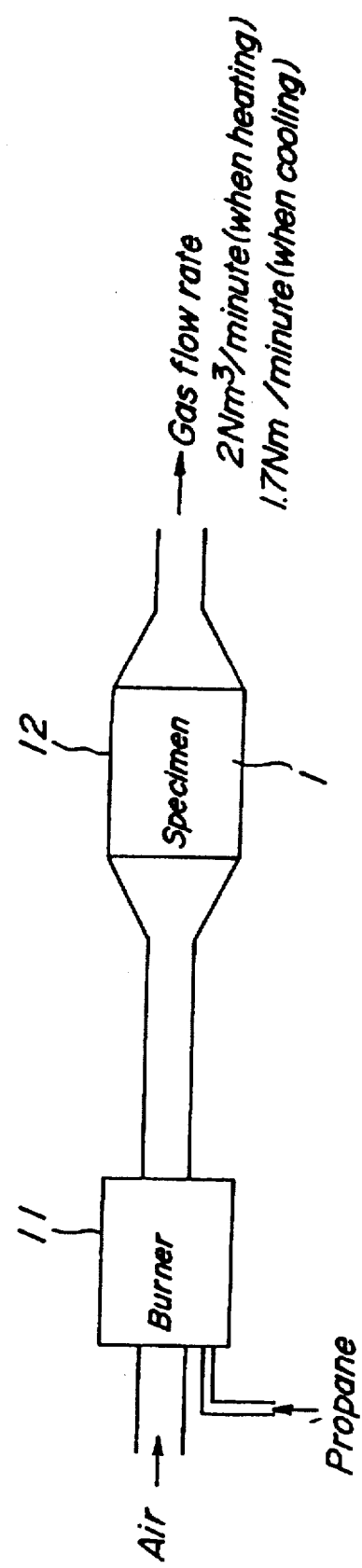
FIG. 3 is a schematic view illustrating a construction of an apparatus used for the estimation test of the spalling strength according to the invention.

Hereinafter, the present invention will be explained according to actual experiments. At first, as shown in FIG. 2, a honeycomb structural body 1 made of cordierite in which a plurality of passages 3 aligned in its axial direction which are defined by partition walls 2 was prepared. In this case, a ratio of L/d was varied, where d is a diameter of an inscribed circle of the honeycomb structural body 1 and L is a length of the honeycomb structural body 1. Then, as shown in FIG. 3, a spalling strength was estimated by using an apparatus comprising a burner 11 using propane as a fuel and a stainless can member 12 in which the honeycomb structural body 1 is secured via a heat-resistive ceramic mat.

Figure 4:
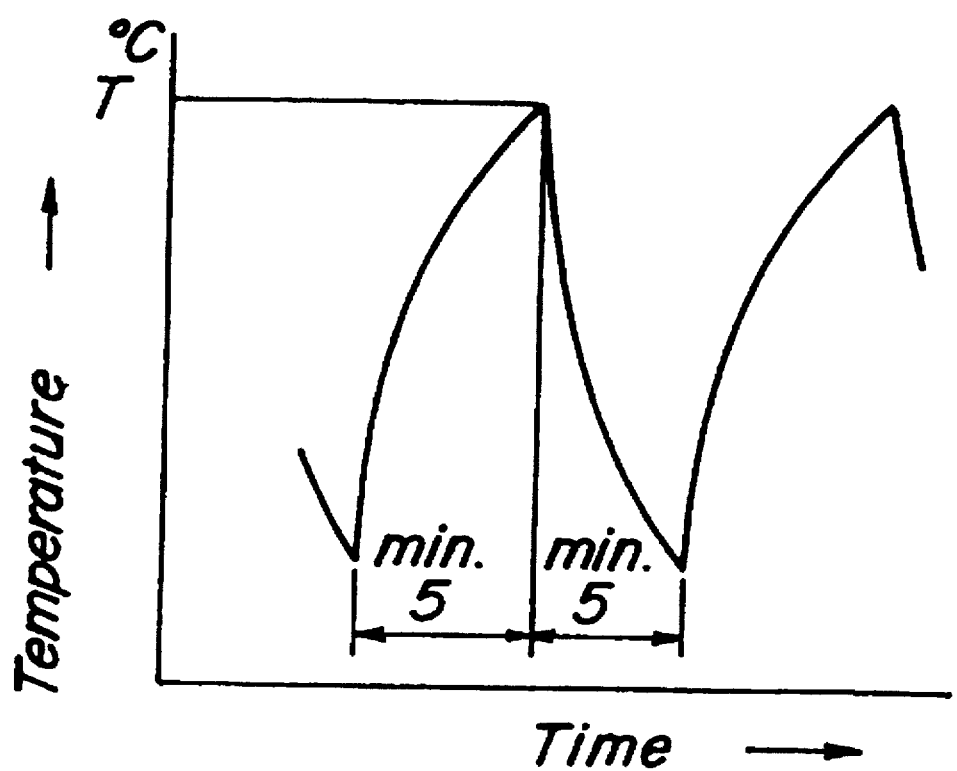
FIG. 4 is a graph depicting one embodiment of a heat curve in the estimation test of the spalling strength according to the invention.

The estimation test of the spalling strength was performed as follows. At first, the honeycomb structural body 1 secured in the stainless can member 12 is heated by using the burner 11. In this case, the heating operation was performed in such a manner that a gas temperature at a position 10 mm upstream of the honeycomb structural body 1 becomes a predetermined temperature (T° C.) after 5 minutes from a start of the heating operation. After that, the honeycomb structural body 1 was cooled for 5 minutes after an end of the heating operation by flowing room temperature air through the honeycomb structural body 1. The above mentioned heating and cooling cycle was repeated 5 times. One heat curve of this cycle is shown in FIG. 4. After that, the same estimation test was repeated under such a condition that the temperature T is increased by 25° C. with respect to the honeycomb structural body 1 having no cracks. Then, a safety temperature was determined as the temperature T just before a defect such as cracks are generated in the honeycomb structural body 1. Moreover, a gas flow rate during the estimation test was 2.0 $Nm^3$/minute when heating and 1.7 $Nm^3$/minute when cooling.

Hereinafter, the results of the estimation test will be explained.

Figure 5:
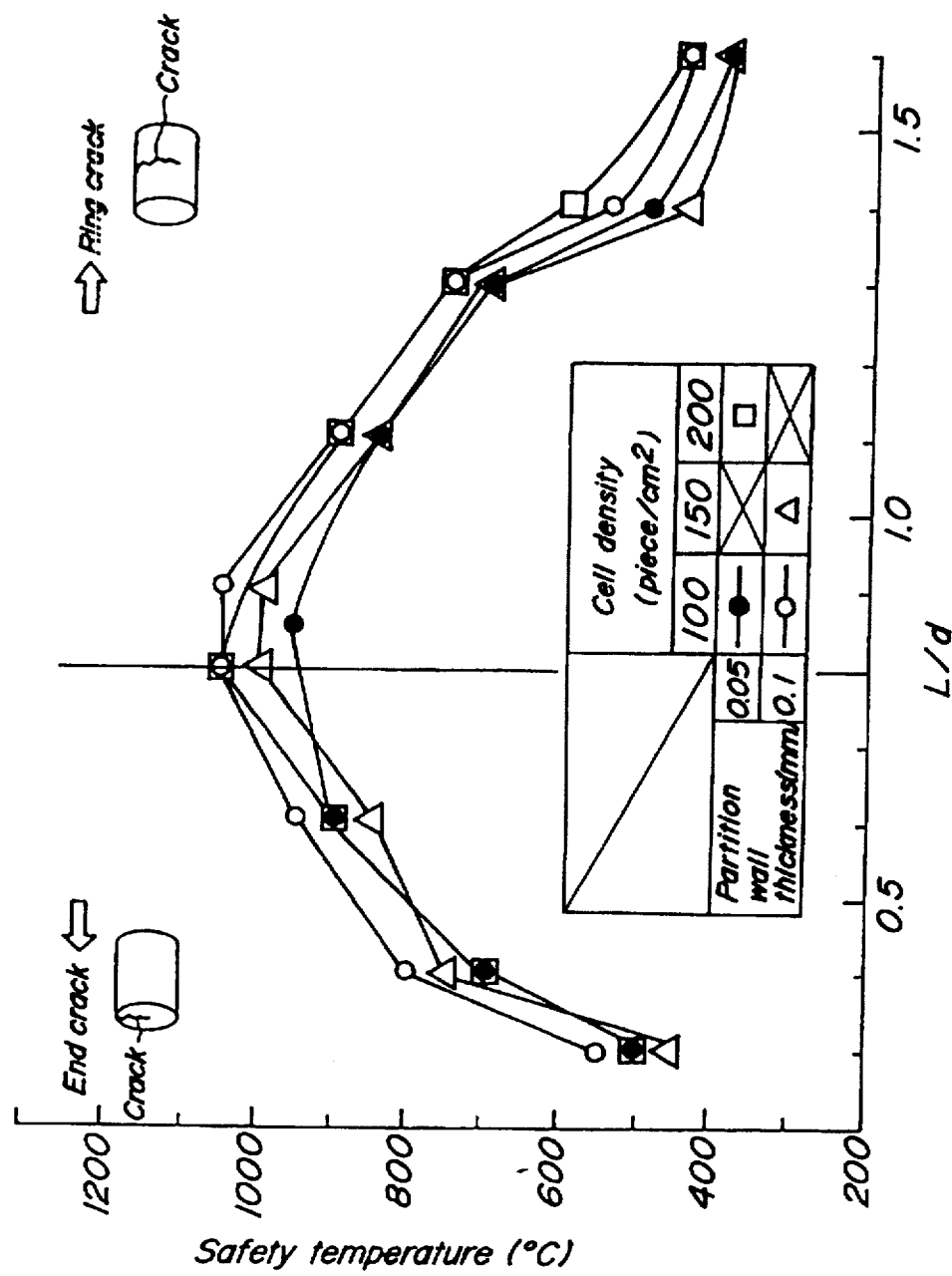
FIG. 5 is a graph showing a relation between a safety temperature and a ratio of L/d of the honeycomb structural body according to the invention.

(1) As to the ratio of L/d:

At first, the spalling strength estimation test mentioned above was performed with respect to the cordierite honeycomb structural bodies 1, each having a porosity of 28% and a volume of 1 liter, in which a ratio of L/d is varied, so as to estimate the ratio of L/d. In this case, the spalling strength estimation test was performed to four series of the honeycomb structural bodies 1, first series having a partition wall thickness of 0.05 mm and a cell density of 100 cells/$cm^2$, second series having the partition wall thickness of 0.1 mm and the cell density of 100 cells/$cm^2$, third series having the partition wall thickness of 0.1 mm and the cell density of 150 cells/$cm^2$, and fourth series having the partition wall thickness of 0.05 mm and the cell density of 200 cells/$cm^2$. The results are shown in FIG. 5. Moreover, the substantially same results as those mentioned above were obtained for the honeycomb structural bodies 1 having a volume of 0.65 liter or 1.3 liter and for the honeycomb structural bodies 1 made of the other material such as alumina, SiC, or SiN having a porosity of 20% or 35%.

From the results shown in FIG. 5, it is understood that the spalling strength of the honeycomb structural body 1 is varied in response to a variation of the ratio of L/d. Moreover, it is understood that the safety temperature larger than 700° C., in which no drawbacks are detected during actual use, is shown in a range of 0.4–1.3. Further, as the fracture type, it is understood that the ring crack is largely generated when the ratio of L/d is larger than a point showing the largest safety temperature in FIG. 5 and the end crack is largely generated when the ratio of L/d is smaller than the point mentioned above. Furthermore, it is understood that the spalling strength is gradually larger from the L/d range of 0.6–1.1 to the L/d range of 0.7–1.0 as compared with that of the L/d range of 0.4–1.3, and is largest in the L/d range of 0.8–0.9. Therefore, it is understood that these L/d ranges are preferable.

Figure 6:
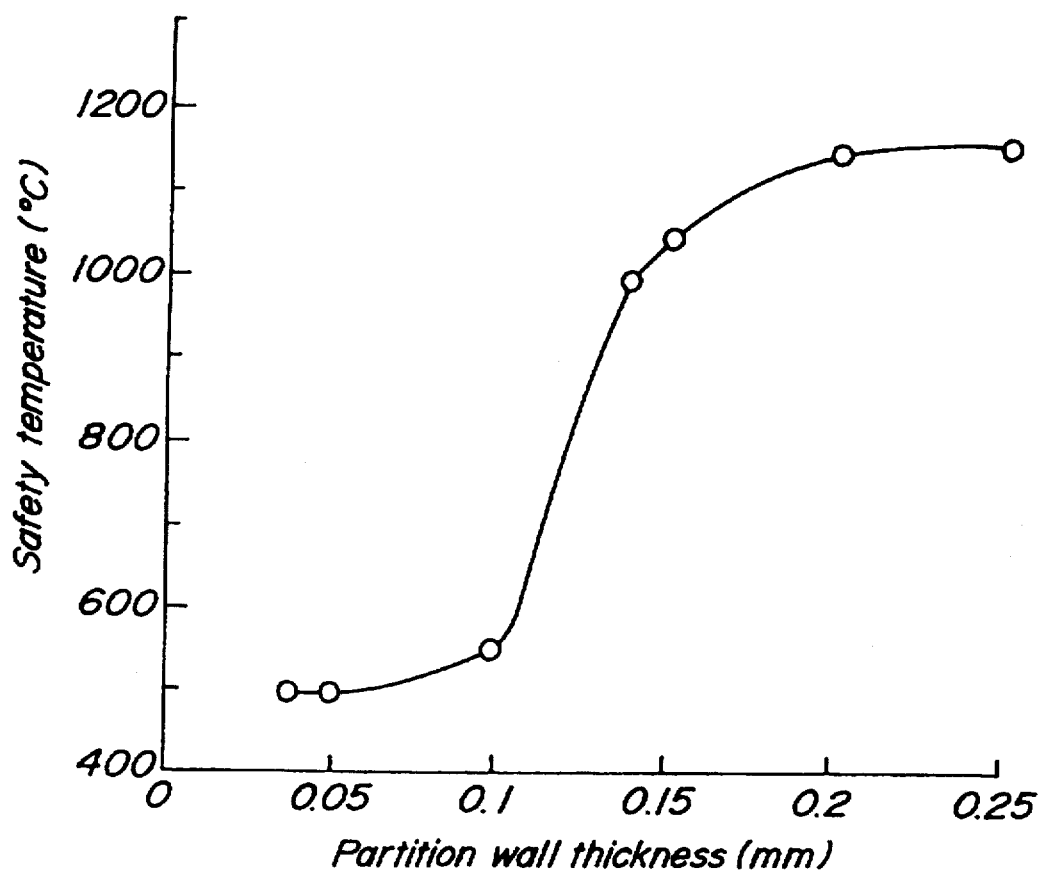
FIG. 6 is a graph illustrating a relation between the safety temperature and a thickness of the partition wall of the honeycomb structural body as a preferable example according to the invention.

(2) As to the partition wall thickness:

Then, the spalling strength estimation test mentioned above was performed with respect to the cordierite honeycomb structural bodies 1, each having a porosity of 28%, a volume of 1 liter, a cell density of 100 cells/$cm^2$, and a ratio of L/d of 1.4, in which the partition wall thickness is varied, so as to estimate the partition wall thickness. The results are shown in FIG. 6. From the results shown in FIG. 6, it is understood that the spalling strength is decreased in response to a decrease of the partition wall thickness. Moreover, it is understood that the spalling strength is decreased remarkably when the partition wall thickness is smaller than 0.1 mm. Therefore, it is understood that the present invention having an object of spalling strength improvement can be preferably applied if the honeycomb structural body has the partition wall thickness of smaller than 0.1 mm.

Figure 7:
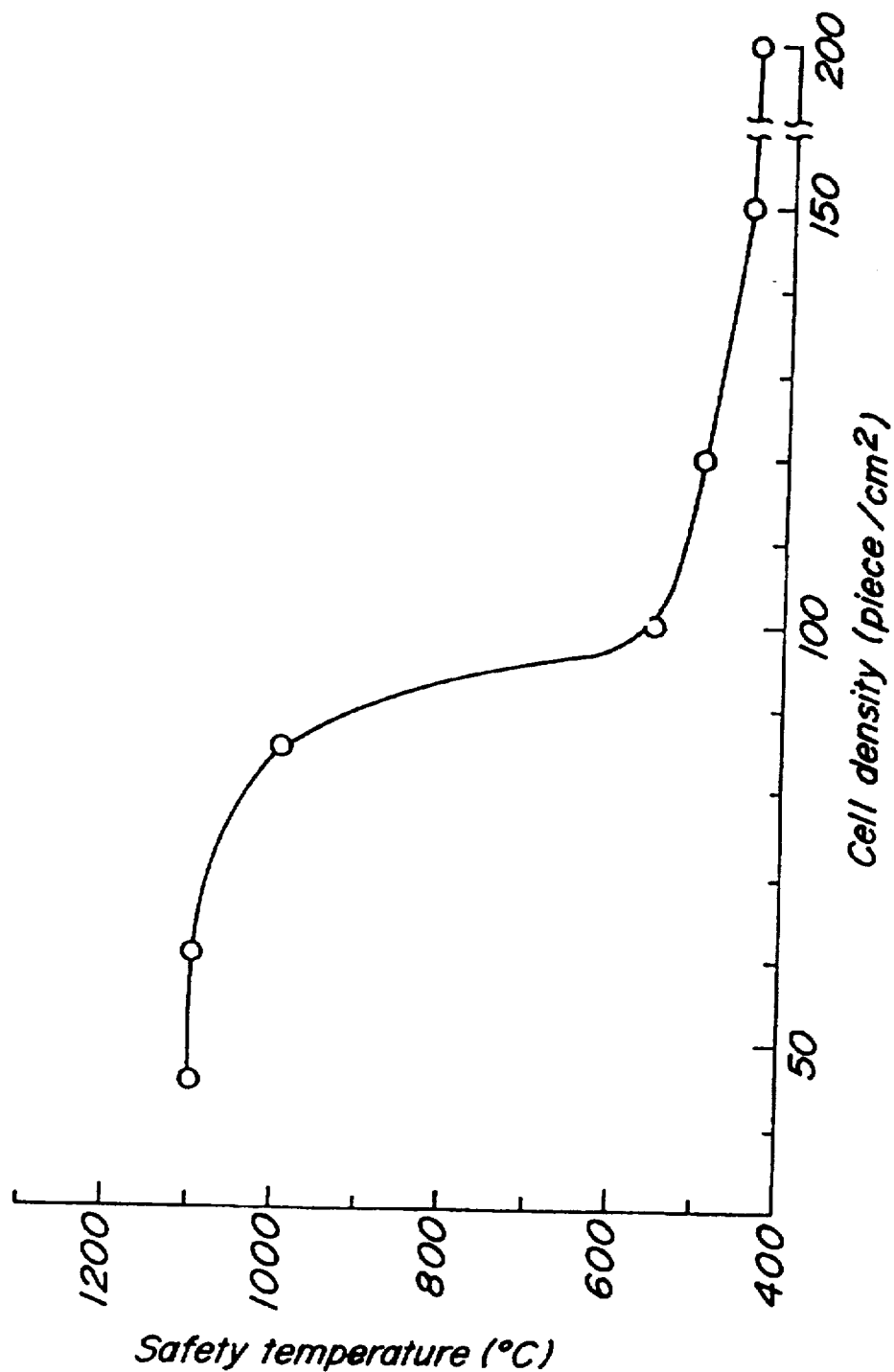
FIG. 7 is a graph depicting a relation between the safety temperature and a cell density of the honeycomb structural body as a preferable example according to the invention.

(3) As to the cell density:

Then, the spalling strength estimation test mentioned above was performed with respect to the cordierite honeycomb structural bodies 1 having a porosity of 28%, a volume of 1 liter, a partition wall thickness of 0.1 mm, and a ratio of L/d of 1.4, in which the cell density is varied, so as to estimate the cell density. The results are shown in FIG. 7. From the results shown in FIG. 7, it is understood that the spalling strength is decreased in response to an increase of the cell density. Moreover, it is understood that the spalling strength is decreased remarkably when the cell density is larger than 100 cells/$cm^2$. Therefore, it is understood that the present invention having an object of spalling strength improvement can be preferably applied if the honeycomb structural body has the cell density of larger than 100 cells/$cm^2$.

As clearly understood from the above explanation, according to the invention, since a ratio of L/d is set in a range of 0.4–1.3, preferably 0.6–1.1, more preferably 0.7–1.0, most preferably 0.8–0.9, where d is a diameter of an inscribed circle of the honeycomb structural body and L is a length thereof, the honeycomb structural body having an excellent spalling characteristic can be obtained. Paricularly, this effect is remarkable if the honeycomb structural body has the partition wall thickness of smaller 0.1 mm and the number of passages of larger than 100 cells per 1 $cm^2$.

What is claimed is:

1. A honeycomb structural body with sufficient spalling strength to withstand temperature cycling between room temperature and 700° C., said honeycomb structural body comprising a plurality of passages aligned in its axial direction which are defined by partition walls, wherein a ratio of L/d is in a range of 0.4–1.3, wherein d is a diameter of an inscribed circle of the periphery of the honeycomb structural body on a plane perpendicular to its axial direction, and L is a length along the axial direction of the honeycomb structural body.

2. The honeycomb structural body according to claim 1, wherein the ratio of L/d is in a range of 0.6–1.1.

3. The honeycomb structural body according to claim 1, wherein a thickness of the partition wall is smaller than 0.1 mm, and the number of passages on a plane perpendicular to the axial direction of the passage is larger than 100 pieces per 1 cm$^2$.

4. The honeycomb structural body according to claim 1, wherein the honeycomb structural body comprises at least one ceramic material selected from the group consisting of cordierite, alumina, SiC and SiN.

5. The honeycomb structural body according to claim 1, wherein the honeycomb structural body is used as a catalyst carrier for purifying an exhaust gas from an internal combustion engine.

6. The honeycomb structural body according to claim 1, wherein the ratio of L/d is in a range of 0.7–1.0.

7. The honeycomb structural body according to claim 1, wherein the ratio of L/d is in a range of 0.8–0.9.

* * * * *